United States Patent [19]

Double et al.

[11] 3,949,527

[45] Apr. 13, 1976

[54] MATERIAL SUPPORTED COVER AND METHOD FOR SECURING SAID COVER TO THE GROUND

[75] Inventors: Paul B. Double; Clayton M. Bryson, both of Winona, Minn.

[73] Assignee: Canamer Leasing Services Inc., Winona, Minn.

[22] Filed: Aug. 9, 1974

[21] Appl. No.: 495,952

[52] U.S. Cl. .......................... 52/4; 52/23; 52/222; 52/741; 52/DIG. 9; 150/52 R
[51] Int. Cl.² ............................................ E04D 1/34
[58] Field of Search ........ 52/3, 4, 5, 23, 83, DIG. 9, 52/222, 63, 741; 150/52 R

[56] References Cited
UNITED STATES PATENTS

| 644,242 | 2/1900 | Combs | 52/3 |
|---|---|---|---|
| 960,270 | 6/1910 | Butler | 52/4 |
| 2,730,150 | 1/1956 | Wunderwald et al. | 52/4 |
| 2,921,592 | 1/1960 | Mackey | 52/83 X |
| 3,355,745 | 12/1967 | Jannuzzi | 52/63 X |
| 3,416,762 | 12/1968 | Headrick | 52/23 |
| 3,715,843 | 2/1973 | Ballinger | 52/3 |
| 3,764,446 | 10/1973 | Martin | 52/DIG. 9 |

FOREIGN PATENTS OR APPLICATIONS

| 114,112 | 6/1920 | United Kingdom | 52/3 |

Primary Examiner—Ernest R. Purser
Assistant Examiner—Leslie A. Braun

[57] ABSTRACT

Method and apparatus for securing stacks of various materials and mobile homes to the ground. In one embodiment, a plurality of cables, ground anchors, cover sheets and load distribution devices are utilized for shielding and securing a stack of materials to the ground. In a second embodiment, a system of cables, imbedded ground anchor plates and attachment means are utilized to secure a mobile home to the ground to resist movement and tipping from wind and to compensate for frost heave.

8 Claims, 11 Drawing Figures

MATERIAL SUPPORTED COVER AND METHOD FOR SECURING SAID COVER TO THE GROUND

BACKGROUND OF THE INVENTION

1. Field of the Invention

Method and apparatus for securing stacks of material and mobile homes to the ground, utilizing anchoring plates which are imbedded in the ground, a cable system attached to the anchor plates for covering the material being secured and specific methods of installing the apparatus and tightening the cables.

2. BACKGROUND OF THE INVENTION

There has long been a need for securing stores of material and mobile homes to the ground and protecting them from the elements. In the past, various devices and methods have been used to cover and secure haystacks and the like. As technology and industry have grown, the quantities and the variety of materials which are stored in the out of doors has increased and mobile homes have proliferated. Stacks of materials such as salt, grain and packaged goods are often several hundred feet long and range up to fifty feet high.

While the securing of stacks of loose materials and unitary structures such as mobile homes to the ground involve different and specific design embodiments, the methods and apparatus used are basically quite similar. Referring first to problems encountered in storing loose, stacked material, large stores of materials stored in the out of doors are subject to rain, wind and other forces which tend to move or otherwiwse damage them. In the case of semi-fluid materials such as grain, ores and salts, the large stacks tend to shift and flow quite easily when under the influence of rain or wind. In addition, when such stacks of materials are "worked", i.e., when portions of the stack are removed, the materials tend to redistribute themselves which may cause the stack to shift or collapse.

Since the early days of agriculture, when tarpalins and ropes were utilized to secure a stack of hay to the ground, few changes have been made in the design of apparatus and methods utilized to store stacks of material (e.g. see U.S. Pat. No. 2,635,562; Abramson). The devices which are available are deficient in that they do not effectively seal the stack from rain, do not securely hold the stack in place for long periods, are easily damaged by sustained wind conditions, are secured to the ground by inadequate means and are designed such that it is difficult to work the stack without initially removing the entire securing system. While very innovative devices have been attempted (see U.S. Pat. No. 2,204,781; Wattles), the Applicant is unaware of simple and economical tie-down systems which avoid these deficiencies.

Referring to ground-securing systems for mobile homes and the like, mobile homes are typically lightweight structures which are merely set on a block foundation or a series of block pedestals when they are placed in a mobile home park or the like. As a result, mobile homes are subject to rocking or vibrating in strong winds, can be tipped over by gusty or hurricane winds or can be removed from their foundation by mere impact such as from a recklessly driven vehicle.

While recent developments have been made in the art of securing mobile homes to the ground, many such systems have been complex in their structure and design or have proven expensive and difficult to install. Such systems generally utilize concrete-embedded anchors or auger-type anchors or extensive and complex systems of braces. In addition, such structures have been applied in such a way as to subject the mobile home to damage in cold climates were ground frost frequently causes heaves in the ground or similar displacing forces.

SUMMARY

The present invention is a method and apparatus for economically and effectively securing materials to the ground. The invention utilizes a plurality of cables which extend over the material and which attach to ground anchor plates which are embedded in the ground. After the cables have been attached to the ground anchor plates, they are winched to a preselected tension level so that they are drawn tight against the material being secured.

In one of the preferred embodiments of the present invention, a flexible cover sheet is utilized in combination with the securing cables and ground anchor plates to cover and secure a stack of semi-fluid or packaged material such as grain or stacked drums. In this embodiment, load distribution devices are attached beneath the various cables to prevent them from embedding themselves into the material stack. In addition, a web of radial and longitudinal retaining lines and ballast devices are utilized to hold the flexible cover sheet to the ends of the material stack.

A second embodiment of the invention is utilized for securing a mobile home or the like to the ground. It utilizes a series of cables which are attached to the mobile home and to a plurality of anchoring plates which are embedded in the ground. The use of the anchoring plates provides an anchor point for the cables which is simple to install, inexpensive and extremely resistant to displacement. The cables are extended either over the mobile home or through its structural base members in such a way as to prevent tipping or vertical displacement of the mobile home in a wide range of wind velocities. A particular scheme of winching the various cables it utilized to firmly secure the mobile home to the ground without damage to it. In addition, a controlled extension device is attached to the cables to allow them to stretch slightly while still maintaining a tensile force in the cables. Thus, the cables can extend slightly while still remaining taught. This prevents damage to the mobile home from the cables when the ground heaves due to frost or similar phenomenon.

DESCRIPTION OF THE PREFERRED EMBODIMENT

Referring to FIGS. 1–11, wherein like numerals refer to like structural elements, the preferred embodiments of the present invention utilize a plurality of cables, ground anchor plates, load-distribution devices and methods of cable arrangement and winching for securing large masses to the ground. In particular, the system can be utilized to tie down large piles of semi-fluid materials such as grain, piles of packaged materials or mobile homes. Because of dissimilarities between the various materials being secured, two general embodiments of the present invention are utilized, one for stacks or piles of material and one for mobile homes. Each of these general embodiments will be described in detail separately.

PREFERRED EMBODIMENT FOR SECURING STACKS OF MATERIAL

FIGS. 1–6 show the various elements of the present invention which form an apparatus and depict a method for covering and securing a stack of material 30 to the ground. The material being secured can be semi-fluid material such as grain or salt, or can be packaged goods such as oil drums or cartons. The stack of material will take on different forms depending on the nature of the material. If the material is a semi-fluid such as grain or salt, it will generally have the shape shown in FIGS. 1 and 2. The Applicant has found that the slope of the side of the pile is generally 25°–40° for such materials. With other types of material, the slope of the stack sides will vary.

To cover the stacked material 30, a flexible cover sheet 5 is used. It is the purpose of cover sheet 5 to protect the material from snow and rain and to prevent wind gusts or sustained wind from shifting the material. While various materials may be used for cover sheet 5, the Applicant has found that materials such as canvas, burlap, asphalt-impregnated nylon, treated paper and various vinyls are particularly suitable. However, as will be pointed out in detail later, the particular design of the present invention is such that it is not necessary to provide a particularly weighty material for cover sheet 5 as has been the case in earlier designs of systems for covering stacks and the like.

Cover sheet 5 is typically made up of several segments (not shown) of material. The segments would typically consist of strips of material which are extended from side to side across the central portion of the stack and radially outward at the ends of the stack. Once these strips of material have been placed over the stack, the adjoining edges of the adjacent strips would be fastened together by sewing or other suitable means. The cover sheet 5 is used to entirely enclose the stack of material 30. In this manner, the material can be covered and sheltered for long periods, typically the period being nine months to one year. When it is desired to remove a portion of the stack of material, segments of the cover 5 can be removed in a manner which will be described in detail later. This process allows one portion of the stack to remain covered while still allowing a portion to be worked or depleted.

Figure 1:
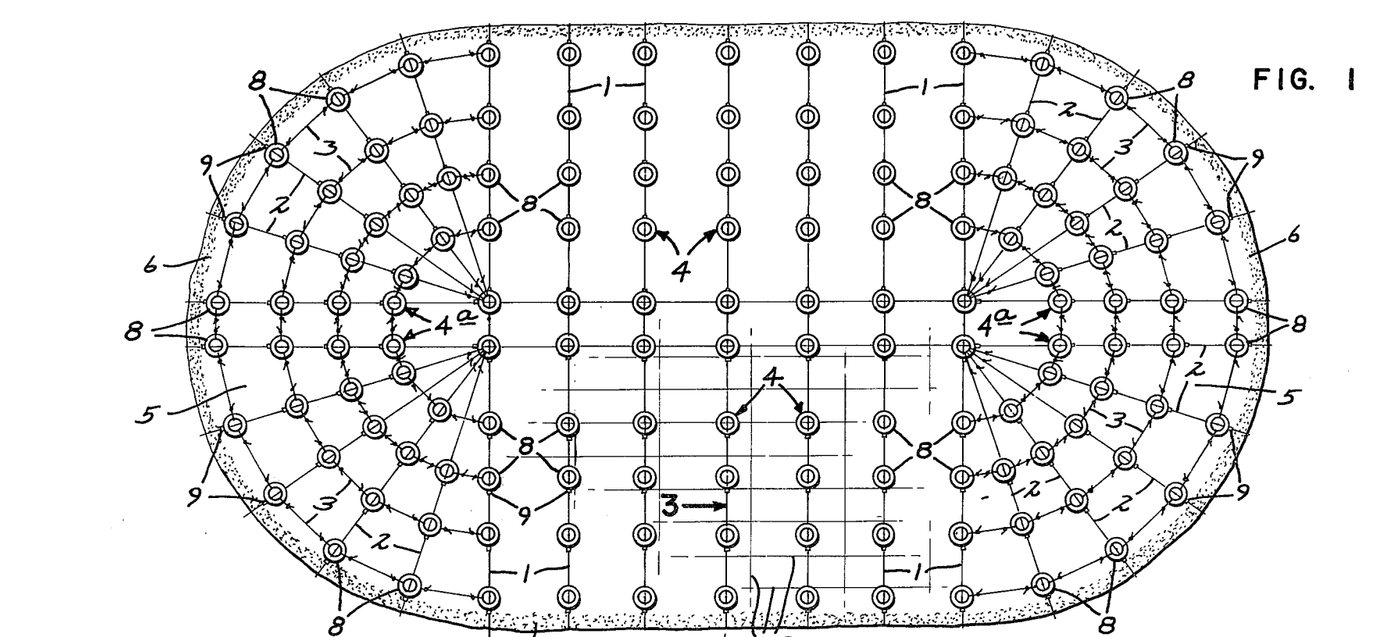
FIG. 1 is a top plan view of ground securing apparatus covering a stack of material.
Figure 2:
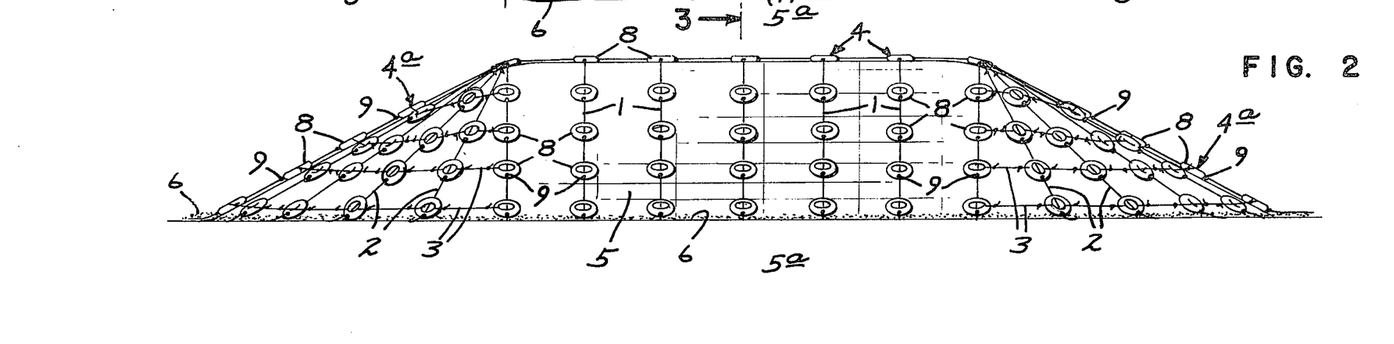
FIG. 2 is a side elevational view of the ground securing apparatus shown in FIG. 1.
Figure 3:
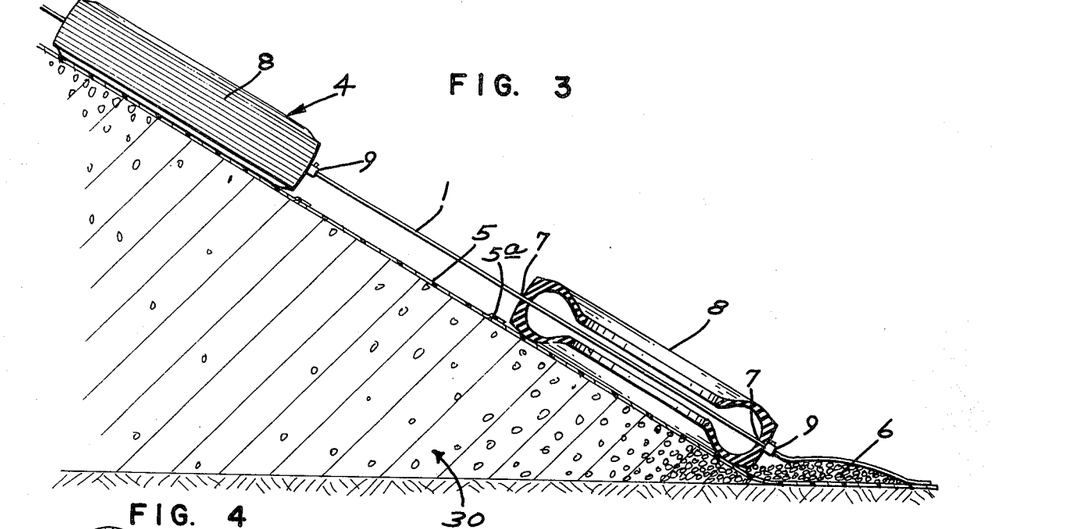
FIG. 3 is a partial sectional view of the load distribution devices along the line 3—3 in FIG. 1.

As is shown in FIGS. 1–3, a ballast material 6 is placed over the base edge of cover sheet 5 to prevent rain, snow or wind from entering beneath cover sheet 5. Various materials may be used for ballast 6, depending on the end use. The Applicant has found that gravel having an average diameter of ⅜ inch is particularly desirable for stored materials such as highway salt crystals. This particular size of ballast aggregate allows the ballast to be blended with the salt so that it does not contaminate gradation specification when the salt is processed. Other types of ballast may also be used including discrete ballast elements such as discarded automobile tires or the like.

Figure 5:
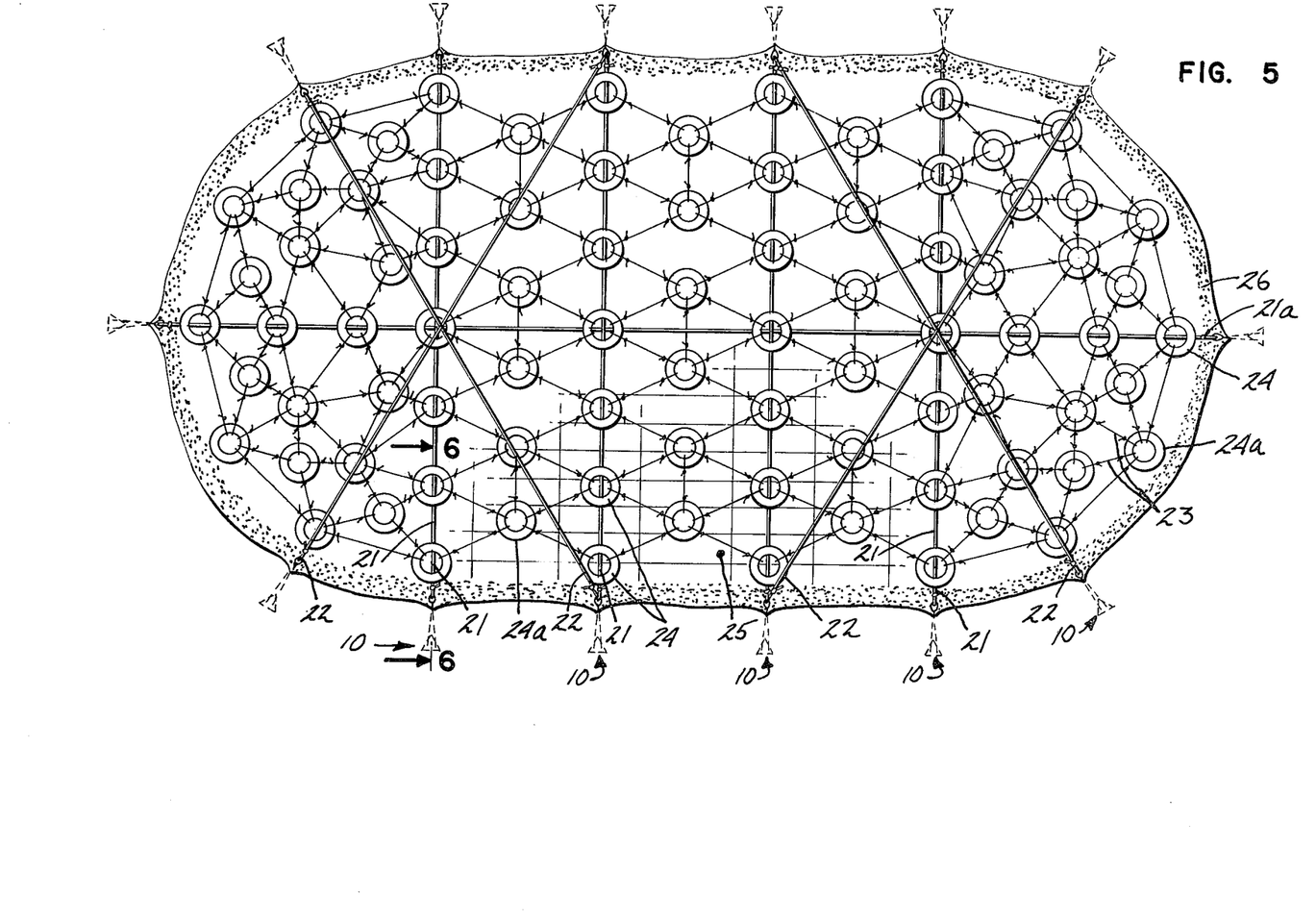
FIG. 5 is a top plan view of an alternative embodiment of the ground securing apparatus covering a stack of material.

To hold cover sheet 5 taught around the stack of material 30 and to utilize cover sheet 5 as a barrier to prevent shifting of the stack from the forces of wind and the like, the preferred embodiment of the present invention utilizes a series of cables, ballast devices, anchoring means and load-distribution devices for securely holding the cover sheet 5 in place and prevent movement or shifting of the material stack 30. One preferred arrangement for these various devices is shown in FIGS. 1 and 2 and a second preferred embodiment is shown in FIG. 5.

Referring to FIGS. 1 and 2, the present invention utilizes a series of securing cables, each designated by the numeral 1, which extend across the mid portion of the material stack 30, generally parallel to one another. In addition, a network of radial retaining lines 2 and longitudinal retaining lines 3 are utilized in combination with ballast devices 4a to secure the cover sheet 5 to the ends of the material stack 30 and will be described in detail later.

The Applicant has found that the best results are obtained for securing a stack of materials to the ground if securing cables 1 are firmly anchored. This anchoring of securing cables 1 requires that they be placed in tension so that they bear against the underlying cover sheet 5 and the material stack 30. So that securing cables 1 can be stressed to the desired level of tension, the Applicant's invention utilizes anchoring devices. The anchoring devices are of three general types. The particular type of anchoring device which is utilized will depend upon the type of surface upon which the material stack 30 is positioned. If material stack 30 is positioned on a concrete slab, either one of two types of devices can be used. One type would be a bracket (not shown) which is bolted or otherwise secured to the concrete. Holes would be provided in the bracket for the securing cables 1 to be threaded through. A second type of system which would be utilized on concrete or which could be utilized on very soft or marshy ground wherein ground anchors could not be utilized, is a deadweight device (not shown). The deadweight device would consist of a drum (e.g. a 55 gallon drum) which is filled with ballast such as cement. Means would be provided on the drum for attaching the ends of securing cables 1 to the drum. The weight of the drum would be carefully selected to provide the desired level of tension in the securing cable 1. The drum would hang freely on the side of the stack near the stack base.

Figure 4:
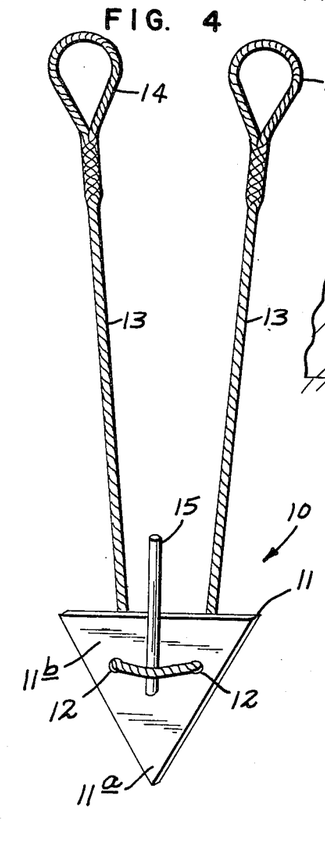
FIG. 4 is a detailed view of a ground anchor plate with a cable attached.

The third general type of anchoring system, and the one which is most advantageous for the preferred embodiment of Applicant's invention, is the anchor device 10 shown in FIG. 4. Anchor device 10 consists of an anchor plate 11 which contains holes 12 through which is threaded an anchor cable 13. In the embodiment shown in FIG. 4, anchor cable 13 has loops 14 at its ends for attachment to securing cables 1. Anchor device 10 is utilized by driving anchor plate 11 into the ground to a predetermined depth. The embedding of anchor plate 11 into the ground is accomplished by exerting a driving force on the embedding prong 15 which is attached to anchor plate 11. When anchor plate 11 has been embedded into the ground (see FIG. 6), the loops 14 on anchor cable 13 are located above the ground and can be attached to the ends of the securing cables 1. Means other than holes 12 may also be utilized for attaching anchor cable 13 to anchor plate 11.

Anchor plate 11 is utilized by first driving it into the ground in a generally vertical orientation. In the configuration shown in FIG. 4, anchor plate 11 has a pointed end 11a which aids the embedding of the plate. Other suitable shapes for anchor plate 11 may also be utilized. When anchor plate 11 is driven into the ground to the desired depth, preferably with the top of the plate at least 42 inches below the ground surface, the anchor cable 13 will protrude above the ground surface.

After anchor plate 11 has been embedded in the ground, anchor cable 13 is attached to securing cables 1. Securing cables 1 are then winched to provide tension in the cable. As this tension is transmitted to anchor plate 11 through anchor cable 13, plate 11 tends to tip away from the vertical with the base edge 11a of anchor plate 11 moving upwardly. This movement of anchor plate 11 tends to align it in a position which is generally perpendicular to the taught anchor plate cable 13. As anchor plate 11 is moved to an angled orientation wherein its surface is generally perpendicular to the line of force in securing cable 1, the broad surface area 11b of anchor plate 11 will be normal to the lines of force from securing cable 1. According to well known theories of soil mechanics, this distribution of force over a large area (i.e. 11b) reduces the compession force per unit area which is exerted on the soil. As a result, the anchor plate 11 is more firmly embedded in the soil and is more resistant to the dislodging force generated by the tension in securing cable 1.

As has been referred to above, it is the purpose of anchor device 10 to provide an anchoring point for securing cables 1 so that they can be stressed to provide compressive force on cover sheet 5 and the material pile 30. Since securing cables 1 extend over the material stack 30, one anchoring device 10 is embedded on each side of stack 30 for each of securing cables 1. To apply tension to the cable 1, one of its ends is securely attached to the anchor cable 13 of one of the anchor devices 10. This can be done by braiding (not shown) the cable 1 through anchor cable 13 or by using clamps 16 (See FIG. 6). The cable 1 is then ready for winching. This is accomplished by attaching the other end of securing cables 1 to the loops 14 of the other anchor device 10 after the anchor plate 11 has been embedded in the ground. A winching device (not shown) is then attached to the end of securing cable 1 and it is stressed to a predetermined tension level. The Applicant has found that a desirable level of tension would be approximately 1,000–2,000 pounds. After this stress level in securing cable 1 has been reached, the free end of securing cable 1 is clamped or otherwise attached to the cable to provide a secure attachment between securing cable 1 and anchor plate 11.

With the high level of tension imparted to the securing cables 1, and because of the relatively narrow width of securing cables 1, (the cables preferably have a 0.25 inch diameter) there is a tendency for the cables to embed themselves into the cover sheet 5 as the cable is winched down to the preselected tension level. To prevent this, a plurality of load-distribution devices, each denoted by the numeral 4 have been placed between securing cables 1 and the material stack 30 along the length of the cable. It is the purpose of load-distribution devices 4 to distribute the compressive loads in securing cables 1 which result from their tension over the larger base area represented by the area of the load-distribution devices. In this manner, the compressive load level resulting from the taught securing cable 1 is sufficiently reduced such that it is not sufficient to embed the cable or the load-distribution device into the material stack 30. In the preferred embodiment shown in FIGS. 1–3, the load-distribution device 4 includes a rubber tire 8 which acts as a semi-rigid footing for distributing the compressive load from cable 1. While other load distribution plates (not shown) may be utilized, discarded automobile tires and the like are particularly desirable because of their availability and economy.

Figure 6:
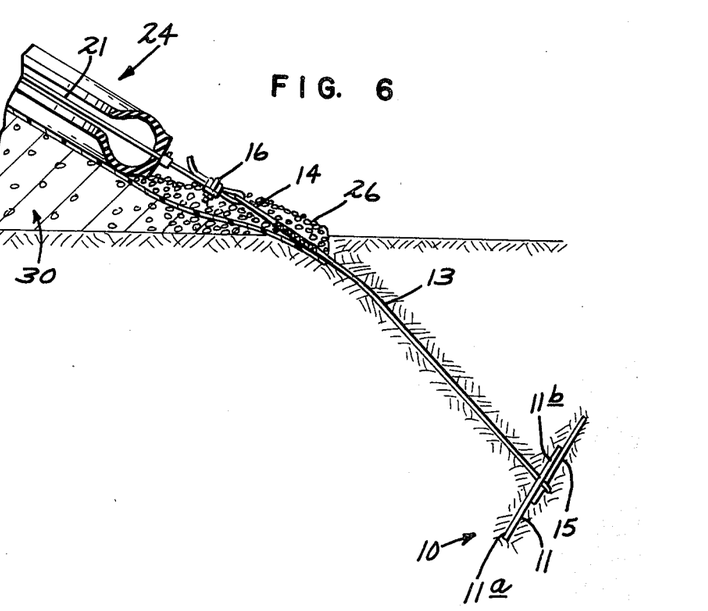
FIG. 6 is a detailed cross-sectional view of the ground anchoring device along the line 6-6 in FIG. 5.

Referring to FIGS. 3 and 6, load-distribution plates 8 are attached to securing cables 1 by means of retaining clamps 9. It is necessary that the load-distribution plate 8 be retained on securing cable 1 so that it can not become dislodged from the securing cable as would be the case if the load-distribution plate were merely positioned beneath securing cable 1. The load-distribution plate 8 is secured to securing cable 1 by means of a hole 7 which is drilled through the sides of the load-distribution plates. The securing cable 1 is strung through the holes 7 and a retaining clamp 9 is attached to securing cable 1. Because the retaining clamp 9, or similar device, is larger than the hole 7, the load-distribution plate 8 is restricted from sliding down the securing cable 1. In addition, this retention method allows the compressive load in securing cable 1 to be distributed evenly over the load-distribution plate 8 because the securing cable 1 is positioned along a selected central portion of the load-distribution plate. This also prevents the vandalism or theft of the load-distribution plates 8. Other suitable means for securely attaching load-distribution plate 8 to securing cable 1 may also be utilized where appropriate.

Having described the arrangement and purpose of securing cables 1, attention is now directed to the webbing of lines and ballast devices which are placed over the ends of material stack 30 as is shown in FIGS. 1 and 2. Because of the generally uneven and arcuate configuration of the ends of an elongated pile of material, it is necessary that a system of anchoring devices be provided to prevent the cover sheet 5 from being blown from the pile and to prevent the wind from shifting material in the end portion of the material stack 30. In the embodiment shown in FIGS. 1 and 2, a series of radial retaining lines 2 are provided which extend from the apex of the material stack 30 to the base edge of the pile. In most instances, the radial retaining lines 2 are not intended to be anchored to the ground. Rather, they are left lose at the base so that they can be easily removed in segments for working or depleting the stack 30. Interspaced longitudinally up the sloping sides of the stack end portion are longitudinal retaining lines 3. It is the purpose of these lines to maintain the radial retaining lines 2 in an evenly spaced fashion. Typically, the longitudinal retaining lines 3 and the radial retaining lines 2 will be fabric lined, such as nylon or hemp, but may also be metal.

Since the radial lines 2 are generally not secured to the ground, it is necessary to provide ballast to hold the cover sheet 5 down on the ends of the material stack 30. Ballast devices 4a have been provided for this purpose. As is shown in FIGS. 1 and 2, ballast devices 4a are positioned at the intersection of longitudinal retaining lines 3 and radial retaining lines 2. The ballast devices 4a may have various forms and be constructed of various materials. The Applicant has found that it is particularly desirable to use discarded automobile tires for the ballast devices 4a because of their availability and economy. The ballast devices 4a can be retained in position on radial retaining lines 2 by means of clamps 9 such as are shown in FIG. 3 or other retaining methods may also be used.

Two radial securing cables 2a are shown in FIG. 1. These are anchored to the ground. The use of such cables is desirable if the material stack 30 is to remain covered for a long period of time without being worked or depleted. The radial securing cables 2a are anchored in the ground in a manner similar to that utilized for securing cables 1 and provide a tension for retaining the bulk of the material stack 30 in place. When the material stack 30 is being worked or depleted, the radial securing cables 2a should not be anchored because they tie down the ends of the material stack 30 and restrict access to it. In such a case, radial retaining lines 2 would be utilized in place of radial securing cables 2a.

FIG. 5 shows alternative embodiment of the present invention for tying down large stacks of material. In the embodiment of FIG. 5, a cover sheet 25 is placed over a stack of material with its base edge 26 secured by means of ballast of various types. A network of securing cables 21 and 22 are utilized to hold the cover sheet 25 and the material stack in place. In the preferred embodiment of FIG. 5, securing cables 21 extend across the apex of the material stack in a generally parallel fashion. Securing cables 22 extend across the apex of the material pile in a X-design. This X-design allows the securing cables 22 to extend over a portion of the ends of the material stack to extend the securing force to that portion of the stack. A longitudinal securing cable 21a may also be extended lengthwise across the apex of the material stack to provide additional securing force. Load-distribution devices (not shown) will also be attached to securing cables 22 to prevent them from embedding themselves into the material stack in the same manner which is utilized for the embodiment shown in FIGS. 1–6. In addition, load-distribution devices 24 are attached to securing cables 21 to prevent them from embedding themselves into the material stack. Their construction and use is the same as that described for the embodiment shown in FIGS. 1 and 2.

The embodiment of FIG. 5 utilizes ballast devices 24a which are interspaced between the securing cables 21. As in the case of the ballast devices 4a shown in FIG. 1, the ballast devices 24a may be any weighty object which tends to hold the cover sheet 25 in place yet does not cut or puncture the cover sheet. Discarded automobile tires are advantageous because of their availability and economy.

It is the purpose of ballast devices 24a to more securely hold the cover sheet 5 in place. This apparatus is particularly desirable when the spacing between securing cables 21 is large. In the covering of smaller type piles, it is often not necessary to have numerous securing devices 21 because the smaller pile of material is not as susceptible to shifting or damage from wind and the like. As a result, the securing cables 21 which are utilized are spaced farther apart. With the further spacing of securing cables 21, a larger area of cover sheet 25 is exposed between the cables. To prevent the wind from loosening the wide expanse of cover sheet 25 between the securing cables 21, the ballast devices 24a are utilized.

In the preferred embodiment of FIG. 5, a unique X-design pattern has been utilized for securing the ballast devices 24a between the securing cables 21. As is noted, the ballast devices 24a are maintained in the center of a box pattern formed by successive groupings of four load-distribution devices 24. The ballast devices 24a are held in this position by means of ropes or cables 23 which are tethered between the ballast devices 24a and the load-distribution devices 24. A similar use of ballast devices 24a and ballast lines 23 is utilized at the end portions of the material stack.

The use of the ground securing device described in the previous section can be summarized as follows. When a large stack of material, such as semi-fluid materials or pre-packaged materials, is to be protected and secured to the ground, a cover sheet 5 is placed over the stack either in segments which are sewn together or as one large sheet. Ground securing cables 1 are placed over the stack to hold it in place. In a preferred embodiment, anchor plates 11 are driven into the ground and cables 13 which are attached to them are secured to the ends of securing cables 1. The securing cables 1 are then winched to the desired tension level (e.g. 1,000 pounds) to provide tension for holding the material in place. Load-distribution devices 4 are attached to the securing cables 1 to distribute the compressive load over the surface of the cover sheet 5. A pattern of radial retaining lines 2 and longitudinal retaining lines 3 are extended over the ends of the material pile and are held in place by means of ballast devices 4a located at the intersection of the retaining lines. To work or deplete the pile of material, the end section of the material pile, preferably that which is opposite the prevailing wind in the area, is uncovered in segments. The cover sheet 5 can be cut away and the retaining lines cut. As the mid-section of the pile is worked, the securing cables 1 can be cut and removed along with various portions of the cover sheet 5.

The present invention incorporates a method for securing large stacks of material to the ground. The material may be a semi-fluid material or a pre-packaged material. Examples would be grain, salt, coal or drums of liquid. The method involves two general procedures. The first procedure is the covering of the stack of material and the second procedure is the anchoring of the stack and the covering to the ground.

In the preferred embodiment, a flexible cover sheet is placed over the stack. This can be accomplished using one single large sheet of material or by placing strips or segments of material over the stack and sewing or otherwise attaching their adjoining edges together. A ballast material is then placed over the edge of the cover sheet at the base of the material stack. The ballast serves to seal off the edge of the cover sheet to prevent moisture and wind from entering beneath the cover sheet. To secure the stack of material and the cover sheet to the ground, a series of securing cables are extended over the top of the material stack in a generally parallel arrangement. In addition, a series of radial retaining lines are extended from the apex of the stack down the sloping sides of the stack end portion. Radial retaining lines are utilized to interconnect the longitudinal retaining lines for purposes of maintaining a particular webbing pattern. Ballast devices are attached to the radial and longitudinal retaining lines to provide weight which holds the lines in place on top of the cover sheet.

After these cables have been placed over the stack, opposed pairs of anchoring devices are attached to the ground. In the preferred embodiment, these anchoring devices are anchor plates which are driven into the ground in a generally vertical orientation. An anchor cable is attached to the anchor plate and has an end protruding from the ground after the anchor plates have been embedded. The ends of the securing cables are then attached to the anchor plate cable which protrudes above the ground.

To provide tension for holding the stack of material to the ground, tension is applied to the securing cables before they are clamped into their final position. This is accomplished by securing one end of the securing cable to one of the anchor plate cables. The cable is attached by means of cable clamps, braiding of the cable or other suitable means. The second end of the securing cable is then threaded through a loop in the end of the anchor cable. It is then winched by means of a winching device to the desired tension. Preferably, the desired tension is 1,000–2,000 pounds of force. After this tension level has been reached, the free end of the securing cable is attached to the cable by means of a clamp, braiding or other means.

Because the taught securing cables tend to embed themselves in the material stack, before the securing cables are securely attached to the anchoring devices, load-distribution devices are threaded onto the cables. This is accomplished by providing holes in the load-distribution devices, such as discarded automobile tires, and positioning the various load-distribution devices along the cable length. Retaining clamps are attached to the securing cables adjacent the load-distribution devices to hold the load-distribution devices in place. The load distribution devices then tend to distribute the compressive load from the securing cables over a larger area of the stack surface. Similarly, retaining clamps are attached to the longitudinal and radial retaining lines to secure the ballast devices in place. Securing cables may also be extended lengthwise along the top edge of the material stack and anchored to the ground in the same method as was just described. Such cables are optional and would be desirable when the stack is extremely large or it is to be totally enclosed for a long length of time, such as one year or longer.

The material stack is worked and depleted by removing the radial and longitudinal retaining lines at the end of the stack which is opposite the prevailing winds in the area. The lines are cut and the cover sheet is cut away in segments. This exposes a portion of the pile for depletion or working. As the working of the pile progresses, additional portions of the cover sheet and of the securing cables and retaining lines are cut away to expose the interior of the material stack.

Preferred Embodiment for Securing Mobile Homes to the Ground

FIGS. 4 and 7–11 show the various elements of the present invention which form an apparatus for securing a mobile home and the like to the ground. It is the function of this embodiment to reduce the vibration and swaying which a mobile home experiences in gusty winds and to restrain the mobile home from tipping in high wind conditions.

Figure 7:
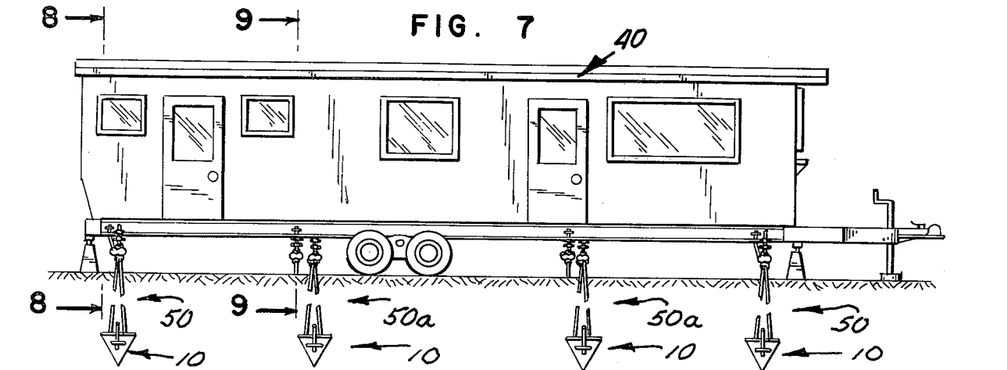
FIG. 7 is a side elevational view of ground securing apparatus used to secure a mobile home to the ground.

As is shown in FIG. 7, a mobile home 40 is typically positioned in a mobile home park or the like either on pedestals 43 or a wheel base 42, or both. In most instances, the mobile home is not physically attached to the pedestals 43. As a result, the mobile home is susceptible to vibration, rocking and tipping. Referring to FIG. 7, the present invention utilizes two or more installations of anchors and cables along the length of the mobile home. These installations are of two general types, one designated by the numeral 50 and the other designated by the numer 50a. As is shown in FIG. 7, it is preferred that installations 50 be located at the ends of the mobile home and that installations 50a be located in the mid section. Other arrangements of installation 50 and 50a may also be utilized where suitable.

Figure 8:
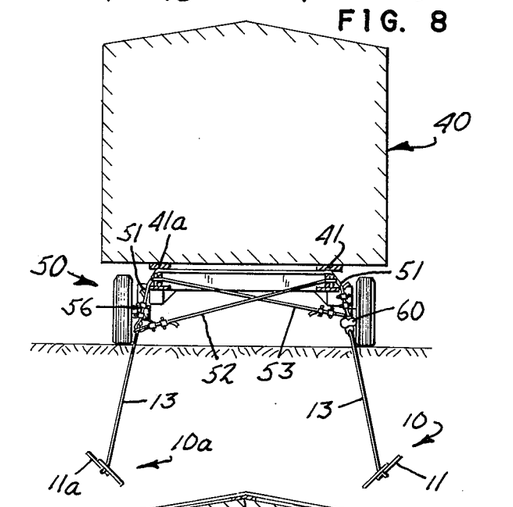
FIG. 8 is an end sectional view of the mobile home securing apparatus of FIG. 7 taken along the line 8—8.

Referring to FIG. 8, cable installation 50 consists of a first securing cable 51, second and third securing cables 52 and 53 which form a X-pattern beneath the mobile home 40 and anchor devices 10 and 10a which attach to the various cables. Prior to attachment to the anchor devices 10 and 10a, the various cables are winched to a preselected tension level as will be described in detail later.

First securing cable 51 extends from one side of the mobile home 40 to the other. In a typical mobile home structure, longitudinal beams 41 and 41a or the like will extend along each side of the base of the moibile home. Holes 42a are provided in the longitudinal beams 41 and 41a and the first securing cable 51 is threaded through the holes. To attach the ends of the first securing cable to the ground, anchor devices 10 and 10a are utilized. Anchor devices 10 and 10a are identical in design and function with the "a" designating one of an opposed pair of devices. As was described in detail in an earlier section of this specification, anchor devices 10 and 10a consist of an anchor plate 11 (see FIG. 4) and an anchor plate cable 13 which is threaded through anchor plate 11. The anchor plate 11 is driven generally vertically into the ground with the looped ends 14 of anchor plate cables 13 protruding above the ground. In the preferred embodiment, the tops of the anchor plate 11 are positioned approximately 42 inches below the ground surface. The depth of embedding for anchor devices 10 and 10a will vary depending on the type of soil which is utilized. Because the anchor plates are driven into the ground vertically and because they are generally thin members, they come to rest in generally undisturbed soil. This is an advantage in comparison to augur or piling devices which disturb the entire mass of soil which surrounds the anchoring device as it is driven into the ground. Each end of the first securing cable 51 is attached to an anchor plate cable 13 located on the respective side or beneath the frame of the mobile home.

From extensive experience in the use of anchor device 10 incorporating an anchor plate 11, the Applicant has found that the best anchoring results for a mobile home 40 are achieved when the anchor plate 11 is driven into the ground generally along a vertical line which is coincident with the side surfaces of the mobile home. Because the anchor plate 11 rotates in the ground as tension is applied to anchor plate cable 13, the anchor plate 11 will tend to be drawn inwardly beneath the mobile home 40 as tension is applied. This positioning of anchor device 10 aligns the various cables in a particular fashion such that a more desirable securing arrangement is obtained.

Positioned between one end of first securing cable 51 and the anchor devices 10 and 10a is a controlled extension device 60. It is the purpose of controlled extension device 60 to maintain a preselected tension in the first securing cable 51 while still allowing the cable to extend away from its anchor point to compensate for raising of the mobile home 40 due to frost heave and the like. If controlled extension device 60 were not utilized, as the mobile home 40 was forced upwardly due to frost heaves and the like, the tension in securing cable 51 would be increased, possibly to levels which would be damaging to the structure of the mobile home. The controlled extension device 60 is also known commercially as a "Kinetic device". It incorporates a resilient member 60a which resists the axial force applied to it in such a way as to maintain the tension, yet will compress slightly to allow extension of the length of member 60a. This in effect, allows cable 51 to "stretch" at a constant tension level. It is the purpose of first securing cable 51 and controlled extension device 60 to restrain the mobile home 40 from moving in a generally vertical direction. Since cable 51 moves freely through structural members 41 and 41a, only one controlled extension device 60 is necessary in cable 51.

In addition to the use of cable 51 to restrain vertical movement of mobile home 40, second and third securing cables 52 and 53 respectively, are provided to prevent mobile home 40 from tipping or swaying. Referring to FIG. 8, the second securing cable 52 is looped at one end with the loop being attached to an opening 42b in longitudinal beam 41. The other end of securing cable 52 is attached to ground anchor 10a by means of attachment to the looped ends 14 of anchor cable 13. Second securing cable 52 may have a controlled extension device (not shown) similar to device 60 linked between it and anchor device 10. However, since the second securing cable 52 is intended primarily to restrict the lateral movement of mobile home 40, the effect of frost heave and the like would not be pronounced in the second securing cable 52.

The third securing cable 53 has one looped end which attaches to longitudinal beam 41a in a manner similar to that described above for cable 52. The other end of the third securing cable 53 is attached to the controlled extension device 60 in combination with the end of cable 51. This method of attachment is the most convenient and simple method, however, it would not be necessary to have a controlled extension device attached to cable 53a for the same reasons noted above.

Figures 10, 11:
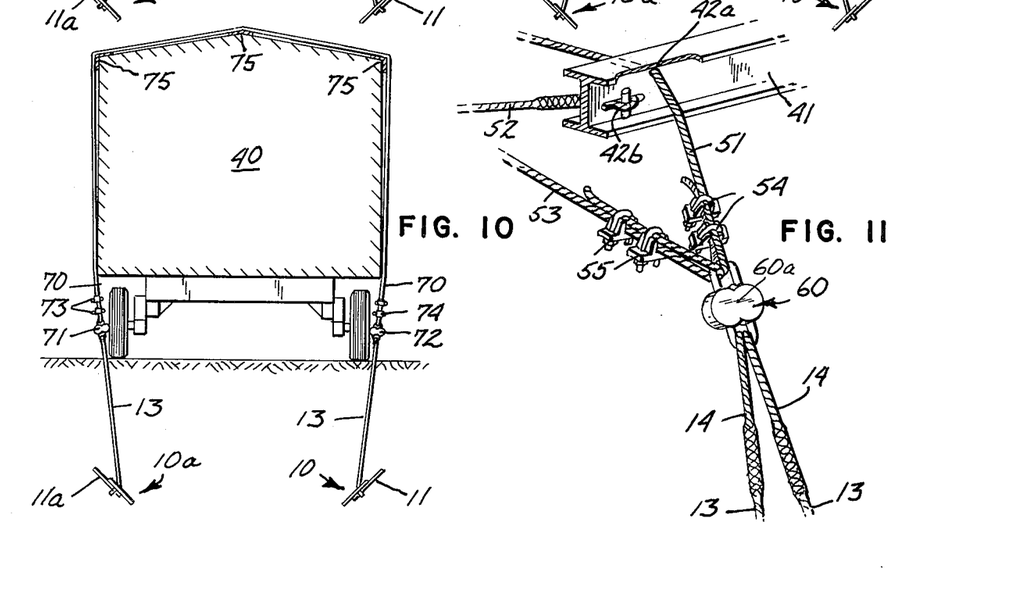
FIG. 10 is an end sectional view of a mobile home with an alternative embodiment of securing apparatus used to secure it to the ground.
FIG. 11 is a detailed perspective view of the cable attachment apparatus shown in FIG. 8.

After each of cables 51, 52 and 53 have been placed in its proper position, and before the ends of the cables are fixedly attached to the anchor plate cables, each cable is winched to a preselected level of tension by placing a winching device (not shown) on the end of each cable. It has been found through extensive experience by the Applicant that a force application between 1,000 and 2,000 pounds is particularly desirable for securing a mobile home to the ground without causing damage to the mobile home. Thus, the ends of each of cables 51–53 would be winched after which the loose ends would be secured to the main portion of the respective cables with clamping devices. FIG. 11 shows clamps 54 and 55 attached to cables 51 and 53 respectively. Similar clamps would be utilized on the ground secured end of cable 52 and the adjacent end of cable 51. It should be noted that as the cables are winched down, the anchor plate 11 tends to turn in the ground and align itself in a position generally perpendicular to the taught cable. For the reasons noted in the earlier section of this specification, this provides a more secure position for the anchor plate 11. As the tension is applied, the anchor plate cable 13 will tend to align itself with the portions of cables 51, 52 and 53 which are located above ground. Depending on the tension applied to the cables and the hardness of the ground, the degree of alignment between cables 51–53 and ground anchor cables 13 will vary. In the Figures, the anchor plate cable 13 is shown as being oriented generally vertically. In softer soils, the anchor cable 13 may be more inclined toward the horizontal.

Figure 9:
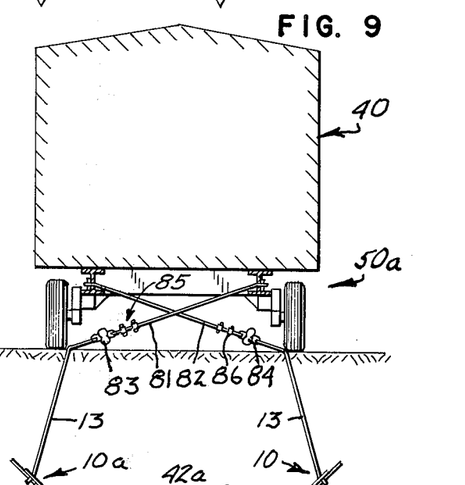
FIG. 9 is an end sectional view of the mobile home securing apparatus of FIG. 7 taken along the line 9—9.

The cable arrangement for installation 50a is shown in detail in FIG. 9. Installation 50a utilizes two crossed cables 81 and 82 but does not utilize a third cable 51 as was the case with installation design 50. As is shown in FIG. 9, cables 81 and 82 are attached to the longitudinal beams 41 and 41a respectively at the base of the mobile home 40 in a manner similar to that shown in FIG. 8 and described above. Anchor devices 10 and 10a are again placed on opposite sides of the mobile home 40 in general alignment with the sides of the mobile home. The free ends of cables 81 and 82 are attached to the anchor plate cables 13 by means of clamp devices 85 and 86, after the cables have been drawn into tension by means of a winch (not shown). The Applicant has found that a force of approximately 800 to 4,000 pounds is most desirable for cables 81 and 82.

In the embodiment shown in FIG. 9, the ends of cables 81 and 82 are looped through controlled extension devices 83 and 84, respectively. As was noted above, it is the purpose of controlled extension devices 83 and 84 to allow cables 81 and 82 to "stretch" while still maintaining the preselected tension levels in the cables. In certain installations of the present invention, it may not be necessary to use devices 83 and 84. As cables 81 and 82 are winched tight, the anchor plates 11 and 11a will tend to align themselves so that they are generally perpendicular to the alignment of anchor plate cable 13. Depending upon the hardness of the ground, the angular relationship between anchor plate cable 13 and cables 82 and 83 will vary.

The Applicant has found that the arrangement of cable installations 50 and 50a as is shown in FIGS. 7–9 is particularly desirable for securely holding a mobile home to the ground. This method is found to be economical, easy to install and extremely effective in reducing away and movement of the mobile home. FIG. 10 shows an alternative embodiment for the attachment of a securing cable to the mobile home 40. In this embodiment, a cable 70 is wrapped around the top of the mobile home and extends slightly inwardly from the sides of the mobile home at its base. Anchor devices 10 are driven into the ground as described above and have anchor plate cables 13 extending from the anchor plate to a point above the ground. The free ends of securing cable 70 are attached to controlled extension devices 71 and 72 respectively. The controlled extension devices are in turn attached to the ends of anchor plate cables 13. The loose ends of securing cable 70 are winched tight after which they are clamped in place by means of cable clamps 73 and 74. The controlled extension devices 71 and 72 allow the cable 70 to "stretch" without reducing or increasing the tension in the cable as was described in detail earlier. Such a need will be desirable when frost heaves and the like occur. While the embodiment of FIG. 10 shows the use of two controlled extension devices, in certain instances one controlled extension device may be suitable since cable 70 is continuous. Load-distribution devices 75 are provided around the top edges of mobile home 40 to prevent the cable 70 from embedding itself and distributing pressure into the mobile home 40 when the cable is drawn into tension. It should be noted that wherever cable clamps are shown in the drawings, no particular design is mandatory and various methods of attachment, including braiding of the cable may also be utilized.

The present invention embodies a method for securing mobile homes to the ground. The steps involved in the method are the installation of cables and ground anchors along the length of a mobile home. There are two general types of installation of the cables. The first installation type is located at each end of the mobile home and the second installation type is located at two positions in the mid section of the mobile home.

Describing the steps involved in the first type of installation, an anchor plate is driven into the ground beneath the mobile home at a point generally beneath the sides or frame of the mobile home. An anchor plate cable is attached to the plate before it is embedded and the ends of the anchor plate cable protrude above the ground after it is embedded. The anchor plates are located at opposite sides of the mobile home at each installation point.

In each of the two types of installations, holes are provided in the longitudinal beams located at the base of the mobile home. A first securing cable is extended through the holes in the longitudinal beam and one end of the cable is attached to one of the anchor plate cables. The attachment is accomplished by means of cable clamps, braiding or similar device. The other end of the first securing cable is attached to one end of a controlled extension device. The other end of the controlled extension device is attached to the second ground anchor cable which protrudes above the ground. Before the end of the first securing cable is securely attached to the controlled extension device, the cable is winched to a stress level of 1,000–2,000 pounds. The free end of the first securing cable is then attached to the cable body by means of clamps or similar device. When the first securing cable is being winched to the preselected tension level, the anchor plates in the ground tend to pivot to provide a more secure anchoring point for the cable.

Additional steps performed in the first installation type are the emplacement of a second and third securing cable to the base of the mobile home. One end of each of the second and third cables is attached to one of the longitudinal beams at the base of the mobile home. The other ends are then threaded through the loops for similar attachment devices on the anchor plate cables which protrude above the ground. Before the ends of the second and third securing cables are secured, a winching device is attached to each cable and the cables are drawn into a tension of 800–4,000 pounds. The ends of the cables are then attached firmly to the cable by means of clamps or similar devices. Controlled extension devices may be interplaced in the second and third securing cables to provide stretch to the cables while still maintaining the preselected tension level.

The second type of installation, located at the mid section of the mobile home, incorporates the steps of attaching one end of each of a first and second cable to each of the longitudinal beams at the base of the mobile home. Ground anchor plates are then driven into the ground to a depth of 42 inches with a ground anchor cable attached to them. The looped end of the ground anchor cable protrudes above the ground after the anchor plate has been embedded. The free ends of the first and second securing cables are then threaded through the loop in the anchor plate cable. Each of the first and second cables are then winched to a preselected tension level of 800–4,000 pounds. The ends of the securing cables are then attached to the cable body by means of clamps or similar devices. In certain situations, it may be desirable to interplace a controlled extension device in each of the first and second securing cables. In such case, an end of the securing cables attached to one end of the controlled extension device and the second end of the controlled extension device is attached to the anchor plate cable. The controlled extension devices would allow the first and second cables to stretch while still maintaining the preselected tension level in the cables. *

An alternative method of attaching the securing cables to the mobile home involves the steps of placing load-distribution plates along the top edges of the mobile home and laying a securing cable over the top of the mobile home. Again, ground anchor plates are driven into the ground and are attached to ground anchor plate cables which protrude above the ground. A controlled extension device is then attached to each of the anchor plate cables. The other end of the controlled extension device is attached to the loose end of the securing cables which extends over the top of the mobile home. The securing cable is then winched to a preselected tension level, preferably 500–4,000 pounds. The loose ends of the securing cable are then firmly secured in place by means of cable clamps or similar devices. This type of cable installation is carried out at several locations along the length of the mobile home.

With reference to FIG. 8, it should be noted that if the cables can be placed at the extreme end of the mobile home, (not shown) the anchor device 10 could be driven into the ground at a point directly below the beams 41 and 41a. This would provide a more secure means of anchoring the cable 51.

What is claimed is:
1. Apparatus for covering and securing a stack of materials to the ground, comprising:
   a. a flexible cover sheet for placement over the entire surface of a stack of material extending to the ground on which the stack rests, said cover sheet including a rim portion which can be extended over the ground adjacent the base of the stack over which said cover sheet is to be laid;

b. particulate ballast material for overlaying the top surface of the rim portion of said cover sheet, the weight of said particulate ballast material forcing it to assume the contour of the ground surface over which said cover sheet is applied thereby forcing substantially all of the rim portion of said cover sheet into abutting engagement with the ground surface to prevent the influx of wind or moisture beneath said cover sheet;

c. a plurality of securing cables for overlaying said cover sheet each of said securing cables having first and second ends to be positioned on opposite sides of a stack of material over which said cover sheet and said securing cables may be laid;

d. a plurality of elongated members, each of said elongated members having a top end fixedly attachable to one end of one of said securing cables, and a bottom end, and each of said elongated members being definable in part by an elongated axis;

e. anchor means attachable to said elongated members to hold said securing cables taught over said cover sheet, said anchor means including:

i. a plurality of anchor plates, each of said anchor plates having a broad surface with a top portion and a bottom portion, said plate being driveable into a portion of ground material adjacent to that which may support a stack of material in a direction generally parallel to said plate board surface, with the top portion of said plate being positionable at one ground strata and the bottom portion being positionable at a second ground strata below the first strata;

ii. said anchor plates each containing pivot connector means for pivotally connecting the bottom end of one of said elongated members to said anchor plate, said pivot connector means being located on said anchor plate such that when tension is exerted on said elongated member the bottom portion of said anchor plate is urged upwardly toward the first ground strata in which the anchor plate top portion is located thereby tending to reorient said anchor plate with its broad surface generally perpendicular to the longitudinal axis of said elongated member;

f. load distribution means including a plurality of load-distributing footings, each of said footings having a base area and being fixedly positionable on said securing cables with the base area abutting said cover sheet for distributing compressive forces which may be built up within said cables over the footing base area to prevent the securing cables from becoming embedded in the cover sheet;

g. footing securing means for attaching and positioning said footings to said securing cables with the footing base area being generally positional beneath said securing cables and with the footings spaced generally along the length of the securing cables to distribute compressive loads which may be developed in the cables therealong; and h. a webbing of lines attached to at least two of said securing cables to overlay the portion of said cover sheet which may be positioned over the end of a stack of material, portions of said webbing of lines being selectively removable from said cover sheet to allow a portion of said cover sheet to be removed from therebeneath from one end of a material stack over which the webbing of lines lies while allowing the other portions of said flexible cover sheets to be held in place by the remaining cables.

2. The apparatus of claim 1 wherein said pivot connector means comprise at least one opening in said pivot plate through which the bottom end of said elongated member may be threaded to allow said elongated member and said anchor plate to pivot with respect to one another in response to tension forces applied to said elongated member.

3. The apparatus of claim 2 wherein said elongated members are flexible cables.

4. The apparatus of claim 3 wherein said footing securing means include:

a. said load distributing footings containing an opening through which said securing cable may be threaded; and b. clamping members movably attached to said securing cables adjacent said load distributing footings to generally retain said load distributing footings in a pre-selected position on said securing cables.

5. The apparatus of claim 2 wherein the broad surface of said anchor plates have a generally triangular planform with the bottom portion being tapered relative to said top portion.

6. A method of covering and securing a stack of material to the ground, comprising:

a. covering the entire surface of the stack with a flexible cover sheet having a rim portion;

b. extending the rim portion of the cover sheet along the ground surface surrounding the stack of material;

c. laying particulate ballast material over substantially the entire length of the rim portion of the cover sheet to force the rim portion into generally abutting engagement with the ground to prevent the influx of wind and moisture;

d. embedding a plurality of anchor plates, each having a broad surface, into the ground in opposed pairs on opposite sides of the stack of material with the top edge of the anchor plates positioned below the ground surface;

e. laying a plurality of securing cables over the stack;

f. positioning the securing cables on the stack with each end of each securing cable located generally adjacent an anchor plate location;

g. placing a plurality of load-distributing devices along each of the securing cables with a base surface of each load-distributing device positioned beneath the securing cable to prevent the securing cable from embedding itself into the stack of material and to prevent cutting and puncturing of the flexible cover sheet;

h. positioning the load-distributing devices in spaced apart relationship along the securing cable to generally evenly distribute any compressive loads which may be developed in the securing cables;

i. securing the load-distributing devices in selected spaced-apart positions on the securing cables to prevent the load distributing devices from moving downwardly along the cables;

j. connecting a first end of each of the securing cables to a point on the broad surface of an adjacent anchor plate such that when tension is applied to the securing cable, a bottom portion of the anchor plate is urged upwardly to tend to reorient the anchor plate;

k. winching each securing cable to a tensil stress level in the range of 1,000–8,000 pounds to partially rotate the ground anchor plate toward a position wherein the broad anchor plate surface tends to assume a position perpendicular to the axis of the securing cable adjacent the anchor plate, and make the cable taught over the cover sheet;

l. attaching a second end of each securing cable to an anchor plate adjacent the second end to secure the taught cable to the ground after the winching operation is completed, by connecting the second end of the securing cable to a point on the broad surface of the anchor plate such that when tension is applied to the securing cable, the bottom portion of the anchor plate is urged upwardly to tend to reorient the anchor plate with its broad surface urged to a position which would be perpendicular to the axis of the anchor cable at that location;

m. laying a webbing of lines over a cover sheet on the ends of the stack of material to weight the cover sheet down; and n. attaching the webbing of lines to the plurality of securing cables to hold them in position relative to said securing cables.

7. The method of claim 6 including the steps of connecting the first and second ends of said securing cables to said anchor plates by connecting the ends of said securing cables to one end of an elongated member and attaching the second end of each elongated member to said anchor plates in the manner described in the other steps.

8. The method of claim 6 including the steps of:

a. attaching ballast devices to the webbing of lines over the ends of the stack to further weight down the cover sheet;

b. positioning ballast devices over the cover sheet between the securing cables; and c. securing the ballast devices to adjacent load-distributing devices by means of ropes to position the ballast devices equal distance from the surrounding load-distributing devices.

* * * * *